United States Patent
Hori et al.

(10) Patent No.: US 9,905,383 B2
(45) Date of Patent: Feb. 27, 2018

(54) CONDUCTION-BREAKING DEVICE

(71) Applicant: TOYODA GOSEI CO., LTD., Kiyosu-shi, Aichi-ken (JP)

(72) Inventors: Keisuke Hori, Kiyosu (JP); Yoshiki Nakamura, Kiyosu (JP); Takaki Fukuyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/238,770

(22) Filed: Aug. 17, 2016

(65) Prior Publication Data
US 2017/0076890 A1   Mar. 16, 2017

(30) Foreign Application Priority Data

Sep. 11, 2015   (JP) .................................. 2015-179690

(51) Int. Cl.
*H01H 39/00* (2006.01)
*B60L 11/18* (2006.01)

(52) U.S. Cl.
CPC ........ *H01H 39/006* (2013.01); *B60L 11/1879* (2013.01); *B60L 2210/40* (2013.01); *H01H 2039/008* (2013.01)

(58) Field of Classification Search
CPC .... H01H 33/72; H01H 39/006; H01H 50/546; H01H 71/02; H01H 89/00; H01H 85/044; B23D 15/145; B23D 35/002; B60L 11/1879
USPC ..... 218/46, 67, 80, 95, 100, 111; 200/61.08; 89/1.14
See application file for complete search history.

(56) References Cited

U.S. PATENT DOCUMENTS

| | | | | |
|---|---|---|---|---|
| 7,182,012 B2* | 2/2007 | Brede | .................. | B23D 15/145 89/1.14 |
| 7,205,879 B2* | 4/2007 | Kordel | ................ | H01H 39/006 337/401 |
| 7,498,531 B2* | 3/2009 | Knauss | ................ | H01H 39/006 200/61.08 |
| 8,432,246 B2* | 4/2013 | Suzuki | .................... | H01H 9/12 337/157 |

(Continued)

FOREIGN PATENT DOCUMENTS

| | | |
|---|---|---|
| JP | 2012-138286 A | 7/2012 |
| JP | 2014-049300 A | 3/2014 |

*Primary Examiner* — Renee S Luebke
*Assistant Examiner* — William Bolton
(74) *Attorney, Agent, or Firm* — Posz Law Group, PLC

(57) ABSTRACT

A conduction-breaking device breaks conduction between a pair of devices in an electric circuit. The conduction-breaking device includes a conductive body having a cuttable portion, an arc-extinguishing chamber having a pair of fixed blades, a gas generator, a cutting member having a pair of movable blades, and a deforming mechanism. When the cuttable portion is cut at two positions by the fixed blades and the movable blades, the cuttable portion forms a separated piece, which is separated from the electric circuit, and first and second remaining portions, which remain connected with the electric circuit. The separated piece has cut ends at opposite ends. The deforming mechanism deforms the separated piece such that the cut ends of the separated piece are located on a leading side in a moving direction of the cutting member with respect to a part of the separated piece between the cut ends.

8 Claims, 7 Drawing Sheets

(56) References Cited

U.S. PATENT DOCUMENTS

| | | | |
|---|---|---|---|
| 8,716,615 B2* | 5/2014 | Fukuyama | H01H 39/006 200/61.08 |
| 2003/0230177 A1* | 12/2003 | Hamilton | B23D 15/145 83/13 |
| 2013/0263714 A1 | 10/2013 | Ukon et al. | |
| 2014/0061161 A1 | 3/2014 | Nakamura et al. | |

* cited by examiner

CONDUCTION-BREAKING DEVICE

BACKGROUND OF THE INVENTION

The present invention relates to a conduction-breaking device that breaks conduction between two devices constituting an electric circuit by cutting a conductive body extending between the devices.

Some electric circuits are provided with a conduction-breaking device for breaking conduction between devices by being activated when a malfunction occurs in a device in the electric circuit or in a system on which the electric circuit is mounted. As one form of such conduction-breaking devices, Japanese Laid-Open Patent Publication No. 2012-138286 discloses a conduction-breaking device, which includes a conductive body, an arc-extinguishing chamber, a gas generator, and a cutting member.

The conductive body includes an elongated plate-shaped cuttable portion and is arranged between devices that constitute an electric circuit. The arc-extinguishing chamber has a fixed blade and is provided on one side of the cuttable portion in the thickness direction. The gas generator is arranged on the opposite side of the cuttable portion from the arc-extinguishing chamber with respect to the thickness direction of the cuttable. The cutting member is arranged between the cuttable portion and the gas generator and includes a movable blade. The movable blade cooperates with the fixed blade to cut the cuttable portion.

With the configuration of the above described conduction-breaking device, when the gas generator generates gas while the conductive body is carrying a current, the cutting member receives the pressure of the gas and is moved toward the arc-extinguishing chamber. As the cutting member moves, the cuttable portion receives a shearing force generated by the fixed blade and movable blade, which cuts the cuttable portion. Accordingly, the conduction between the devices is broken.

When the conduction-breaking device is activated and the conductive body in a current-carrying state is cut, a pair of cut ends are formed in the conductive body. An arc may be generated due to the potential difference between the pair of cut ends. An arc is a phenomenon in which insulation of gas present between the cut ends is overcome and a current flows between the cut ends.

When an arc is generated, the cut ends are electrically connected to each other. In this case, although being physically cut, the conduction is not broken, and the conductive body may remain in a current-carrying state. Further, the arc may melt the conductive body and its surrounding plastic members.

In this regard, the conduction-breaking device of Japanese Laid-Open Patent Publication No. 2012-138286 has two fixed blades, which are arranged in the arc-extinguishing chamber and separated from each other in the longitudinal direction of the cuttable portion. The cutting member has two movable blades at two positions that are separated from each other in the longitudinal direction of the cuttable portion. Thus, as the cutting member moves, the cuttable portion receives shearing force generated by the fixed blades and movable blades at two positions. The shearing force cuts the cuttable portion at the two positions. When the cuttable portion is cut at the two positions, the cuttable portion forms a separated piece, which is separated from the electric circuit through the cutting action, and two remaining portions, which remain connected to the electric circuit. Accordingly, the conduction between the devices is broken. Since the cuttable portion is cut at two positions, the electric resistance is increased. Therefore, the voltage required to generate and maintain an arc is increased. That is, an arc is unlikely to be generated.

However, in the conduction-breaking device of Japanese Laid-Open Patent Publication No. 2012-138286, the separated piece is formed to have a flat shape like the shape prior to the cutting action. Thus, the distance between each cut end of the separated piece and the cut end of the corresponding remaining portion is short. The device of the publication is therefore susceptible to improvement in terms of attenuation of arcs.

SUMMARY OF THE INVENTION

Accordingly, it is an objective of the present invention to improve the attenuation effect in a conduction-breaking device that cuts a cuttable portion at two positions.

To achieve the foregoing objective and in accordance with one aspect of the present invention, a conduction-breaking device is provided that is configured to break conduction between a pair of devices in an electric circuit. The conduction-breaking device includes a conductive body, an arc-extinguishing chamber, a gas generator, and a cutting member. The conductive body is arranged between the devices and includes an elongated plate-shaped cuttable portion. The arc-extinguishing chamber is formed on one side of the cuttable portion in a thickness direction and has a pair of fixed blades. The gas generator is arranged on an opposite side of the cuttable portion from the arc-extinguishing chamber in the thickness direction. The cutting member is arranged between the cuttable portion and the gas generator to be moved toward the arc-extinguishing chamber by gas generated by the gas generator. The cutting member includes a pair of movable blades, which cooperates with the fixed blades to cut the cuttable portion. When the cuttable portion is cut at two positions by the fixed blades and the movable blades, the cuttable portion forms a separated piece, which is separated from the electric circuit and pushed into the arc-extinguishing chamber by the cutting member, and first and second remaining portions, which remain connected with the electric circuit, and thus conduction between the devices is broken. The separated piece has cut ends, which are formed by cutting of the cuttable portion, at opposite ends. The first and second remaining portions each have a cut end, which is formed by cutting of the cuttable portion. An arc generated between the cut end of the first remaining portion and the corresponding cut end of the separated piece and an arc generated between the cut end of the second remaining portion and the corresponding cut end of the separated piece are attenuated in the arc-extinguishing chamber. The conduction-breaking device further includes a deforming mechanism, which deforms the separated piece such that the cut ends of the separated piece are located on a leading side in a moving direction of the cutting member with respect to a part of the separated piece between the cut ends.

DETAILED DESCRIPTION OF THE PREFERRED EMBODIMENTS

First Embodiment

A conduction-breaking device C for a vehicle according to a first embodiment will now be described with reference to FIGS. 1 to 6.

Figure 2:
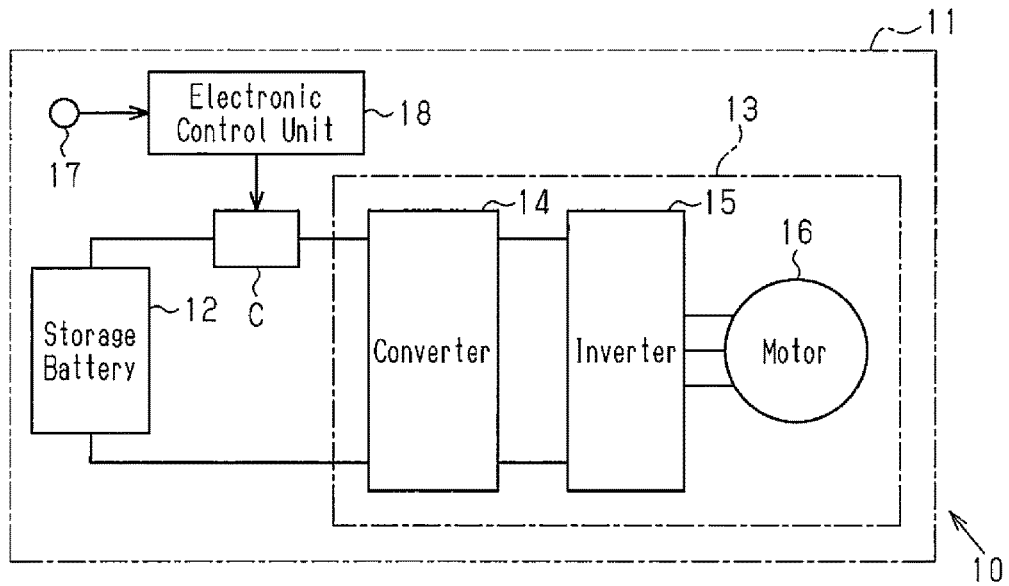
FIG. 2 is a schematic diagram showing an electric circuit in which the conduction-breaking device of FIG. 1 is used.

FIG. 2 shows an electric circuit 11 in which the conduction-breaking device C is incorporated. The electric circuit 11 includes as its components a storage battery 12 and an electric device 13. In the electric circuit 11, the electric device 13 is operated by power supplied from the storage battery 12. The electric device 13 is configured by a converter 14, which increases the voltage of the power delivered from the storage battery 12 and outputs power of the increased voltage, an inverter 15, which converts DC power from the converter 14 into AC power suitable for driving a motor and outputs the AC power, and a motor 16, which is driven by the AC power output from the inverter 15.

The electric circuit 11 is mounted on a vehicle 10. When the vehicle 10 receives an impact due to a collision, the electric device 13 may not properly operate, or current leakage from the electric circuit 11 may occur. Thus, the vehicle 10 is provided with the conduction-breaking device C, which breaks, at a collision, conduction between devices in the electric circuit 11, such as between the storage battery 12 and the electric device 13. The vehicle 10 includes a collision sensor 17 for detecting the presence of a collision and outputting the detected result as an output signal and an electronic control unit 18, which is configured mainly by a microcomputer and receives the output signal of the collision sensor 17. When detecting a collision of the vehicle 10 based on an output signal of the collision sensor 17, the electronic control unit 18 activates the conduction-breaking device C. The activation of the conduction-breaking device C discontinues the supply of power from the storage battery 12 to the electric device 13.

Figure 1:
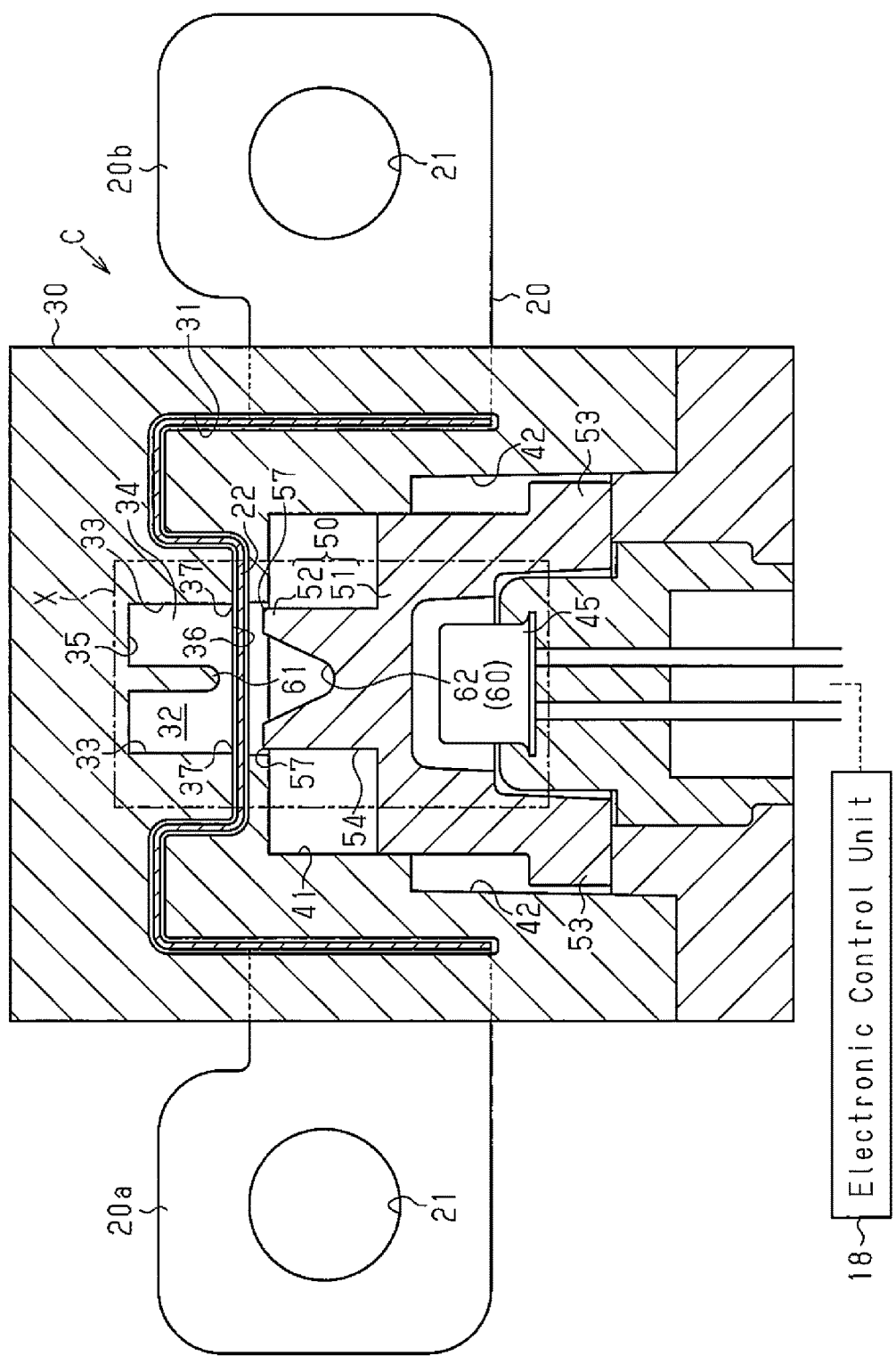
FIG. 1 is a cross-sectional view showing the internal structure of a conduction-breaking device for a vehicle according to a first embodiment.

As illustrated in FIG. 1, the conduction-breaking device C includes a conductive body 20, a case 30, an explosive type gas generator 45, and a cutting member 50. Components in the conduction-breaking device C will be described below.

<Conductive Body 20>

The conductive body 20 forms a conduction path for establishing conduction between the storage battery 12 and the converter 14 and is also referred to as a bus bar. The conductive body 20 is made of a metal material having a high electric conductivity. A typical example of such a metal material is copper, but other materials such as brass or aluminum may be used. The opposite ends of the conductive body 20 configure external connectors 20a, 20b. The external connectors 20a and 20b are connected to the storage battery 12 and the converter 14. Specifically, each of the external connectors 20a, 20b has a through hole 21. A fastener such as a screw is inserted in each through-hole 21 so that one of the external connectors 20a and 20b is connected to a terminal conductive with the storage battery 12 and the other is connected to a terminal conductive with the converter 14. In this way, the conductive body 20 is connected to the terminals of the storage battery 12 and the converter 14 in the electric circuit 11, respectively, via the external connectors 20a and 20b, so that the storage battery 12 and the converter 14 are electrically connected to each other via the conductive body 20.

In addition to the external connectors 20a, 20b, the conductive body 20 has an elongated plate-shaped cuttable portion 22 arranged between the external connectors 20a, 20b. The cuttable portion 22 extends between the external connectors 20a and 20b in their arrangement direction (in the lateral direction as viewed in FIG. 1).

The direction in which the cuttable portion 22 extends, or the direction in which the external connectors 20a and 20b are arranged, is denoted as a longitudinal direction of the cuttable portion 22. The thickness direction of the cuttable portion 22 refers to the thickness direction of the cuttable portion 22 before being cut.

<Case 30>

Figure 3:
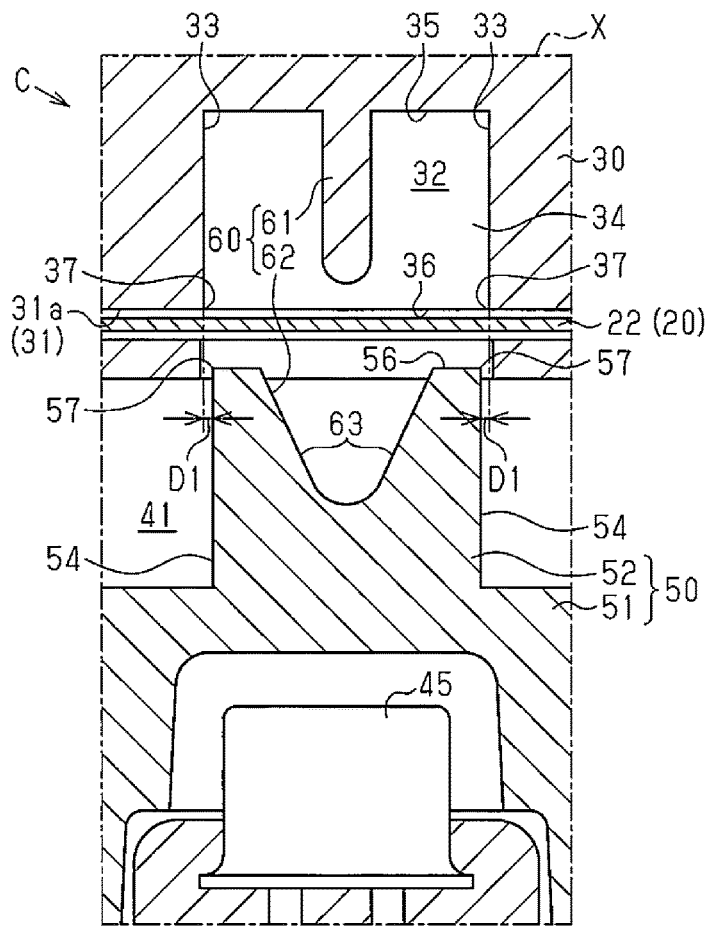
FIG. 3 is an enlarged partial cross-sectional view showing section X in FIG. 1.

As shown in FIGS. 1 and 3, the case 30 is made of a material having an electrical insulating property and a high strength such as a plastic. The case 30 includes an arrangement portion 31, in which the conductive body 20 is arranged. The arrangement portion 31 has an arrangement surface 31a, which is a wall surface on one side in the thickness direction of the cuttable portion 22. The arrangement surface 31a is perpendicular to the thickness direction of the cuttable portion 22. Specifically, of the wall surfaces on the opposite sides of the arrangement portion 31 in the thickness direction of the cuttable portion 22, a wall surface on the leading side of the movement direction of a cutting member 50, which will be discussed below, forms the arrangement surface 31a.

The conductive body 20 is arranged in the arrangement portion 31 with the external connectors 20a and 20b exposed to the outside of the case 30. The case 30 includes an arc-extinguishing chamber 32 located on one side of the cuttable portion 22 with respect to the thickness direction (on the upper side as viewed in FIG. 1).

In the arc-extinguishing chamber 32, the cutting member 50 cuts the cuttable portion 22 at two positions. When the cuttable portion 22 is cut, an arc is generated between cut ends 23a, 23b and cut ends 24a, 24b (see FIG. 6), which are formed through the cutting action. The generated arc is attenuated in the arc-extinguishing chamber 32. The depth (the dimension in a direction perpendicular to the elevation of FIG. 1) of the arc-extinguishing chamber 32 is set to be slightly greater than the width (the dimension in a direction perpendicular to the elevation of FIG. 1) of the cuttable portion 22 so that a separated piece 23 formed by cutting the cuttable portion 22 can enter the arc-extinguishing chamber 32.

Figure 5:
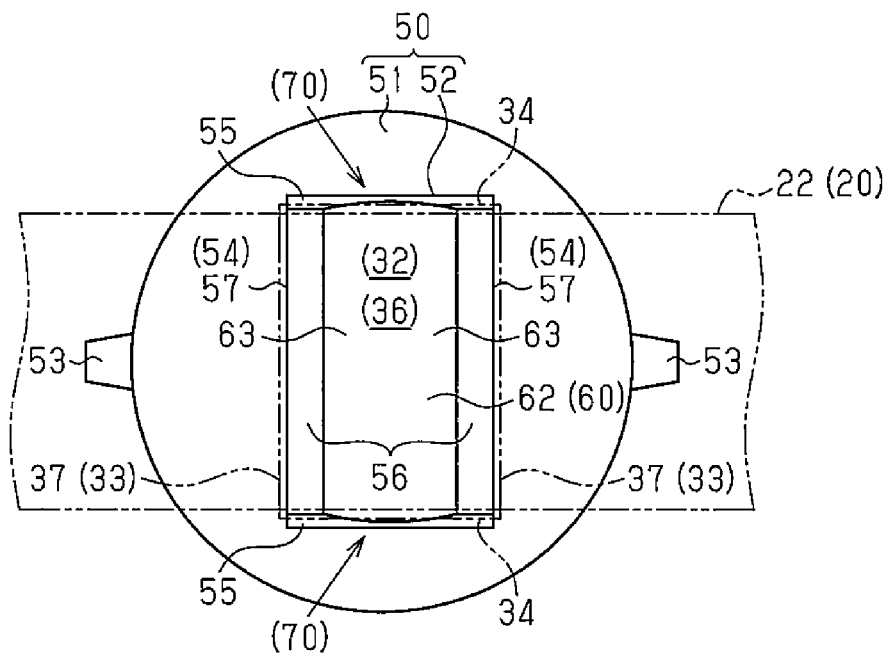
FIG. 5 is an explanatory diagram showing the cutting member and the cuttable portion as viewed from above.

As shown in FIGS. 3 and 5, the inner wall surfaces of the arc-extinguishing chamber 32 include a pair of first inner side wall surfaces 33, a pair of second inner side wall surfaces 34, and a bottom wall surface 35. The first inner side wall surfaces 33 extend in the thickness direction of the cuttable portion 22 from two positions separated from each other in the longitudinal direction of the cuttable portion 22. The second inner side wall surfaces 34 extend in the thickness direction of the cuttable portion 22 from two positions separated from each other in the width direction of the cuttable portion 22. The arc-extinguishing chamber 32 has a rectangular opening 36 at the boundary with the arrangement surface 31a. The bottom wall surface 35 is located at the farthest position from the opening 36 toward the leading side in the moving direction of the cutting member 50 and is parallel with or substantially parallel with the cuttable portion 22 before being cut.

The boundary between each first inner side wall surface 33 and the arrangement surface 31a form a fixed blade 37, which extends in the width direction of the cuttable portion 22.

As shown in FIG. 1, the case 30 has a guide chamber 41, which is located on the opposite side of the cuttable portion 22 from the arc-extinguishing chamber 32 with respect to the thickness direction of the cuttable portion 22 (on the lower side as viewed in FIG. 1). The guide chamber 41 extends in the thickness direction of the cuttable portion 22 and has a substantially cylindrical shape. Guide grooves 42, which extend in the thickness direction of the cuttable portion 22, are formed in the inner wall of the guide chamber 41.

<Gas Generator 45>

The gas generator 45 is used as a drive source of the conduction-breaking device C. The gas generator 45 is arranged in the case 30 with a part exposed to the guide chamber 41. That is, the gas generator 45 is located on the opposite side of the cuttable portion 22 from the arc-extinguishing chamber 32 with respect to the thickness direction of the cuttable portion 22. The gas generator 45 is connected to the electronic control unit 18. The gas generator 45 receives an activation signal from the electronic control unit 18 to ignite and burn the incorporated explosive in response to an activation signal, thereby generating gas.

In general, a device driven by the explosive type gas generator 45 can be more quickly driven, and is of lower costs and more reliable in its operation than a device using another system (such as electromagnetic one) as a drive source.

<Cutting Member 50>

Figure 4:
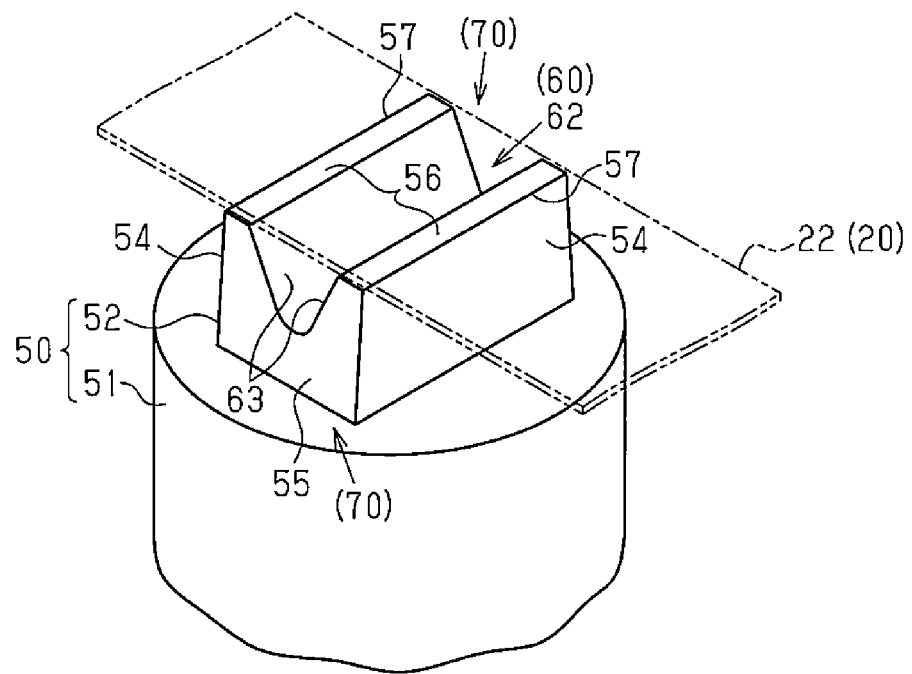
FIG. 4 is a partial perspective view showing a part of the cutting member of the conduction-breaking device according to the first embodiment, together with a part of the cuttable portion.

As shown in FIGS. 1, 4, and 5, the cutting member 50 is adapted to cut the cuttable portion 22 at two positions separated from each other in the longitudinal direction of the cuttable portion 22. The cutting member 50 is made of a material having an electrical insulating property and a high strength such as a plastic. The cutting member 50 is located in the guide chamber 41 and arranged between the cuttable portion 22 and the gas generator 45. The cutting member 50 includes a substantially columnar base portion 51, which extends in the thickness direction of the cuttable portion 22, and a blade portion 52, which protrudes toward the arc-extinguishing chamber 32 from the base portion 51. The base portion 51 has, on the outer wall surface, guide protrusions 53, which extend in the thickness direction of the cuttable portion 22. The guide protrusions 53 are engaged with the guide grooves 42 of the guide chamber 41 so that the base portion 51 is movable toward the arc-extinguishing chamber 32.

As shown in FIGS. 3 and 5, the outer wall surfaces of the blade portion 52 include a pair of first outer side wall surfaces 54, a pair of second outer side wall surfaces 55, and two outer end wall surfaces 56. The first outer side wall surfaces 54 extend in the thickness direction of the cuttable portion 22 from two positions separated from each other in the longitudinal direction of the cuttable portion 22. Each first outer side wall surface 54 is located at a position separated from the corresponding fixed blade 37 by a slight distance D1 in the longitudinal direction of the cuttable portion 22. The distance D1 is, for example, approximately 0.5 mm. The second outer side wall surfaces 55 extend in the thickness direction of the cuttable portion 22 from two positions separated from each other in the width direction of the cuttable portion 22. The outer end wall surfaces 56 are located at a position that is separated from the base portion 51 of the blade portion 52 and farthest from the base portion 51 toward the leading side in the moving direction of the cutting member 50. That is, the outer end wall surfaces 56 are located on the leading side of the cutting member 50 in the cutting member 50. The outer end wall end surfaces 56 are parallel with or substantially parallel with the cuttable portion 22 before being cut.

The boundary between each outer side wall surface 54 and the corresponding outer end wall surface 56 extends in the width direction of the cuttable portion 22 and constitutes a movable blade 57, which cooperates with the corresponding fixed blade 37 to shear the cuttable portion 22. The movable blades 57 are located at the same position with respect to the moving direction of the cutting member 50.

Figure 6:
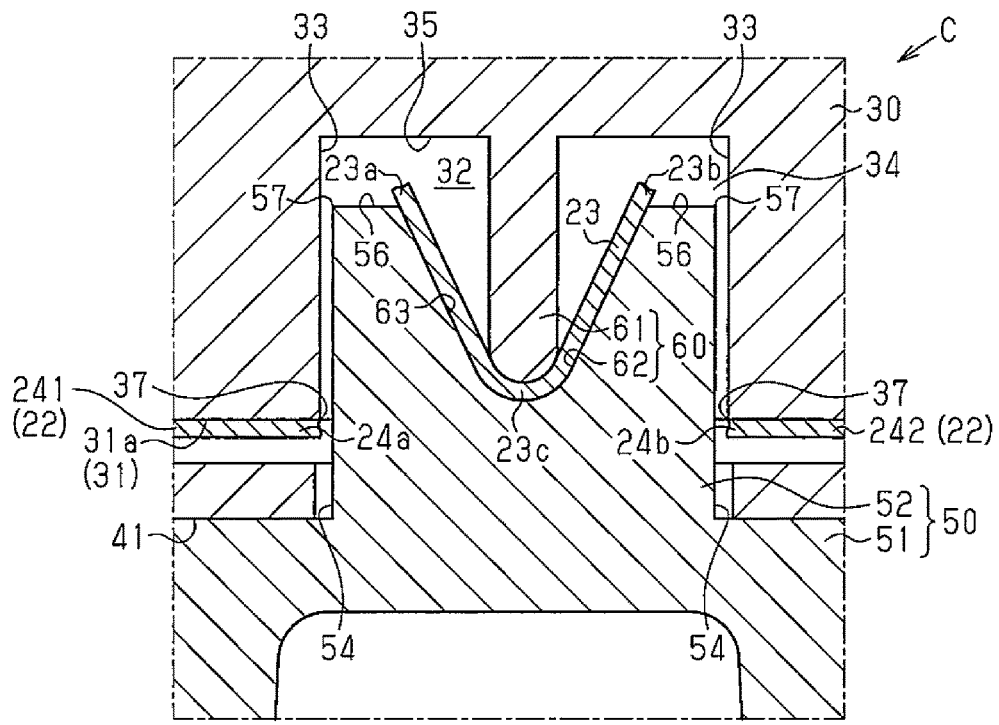
FIG. 6 is a partial cross-sectional view of the first embodiment, illustrating a state after the separated piece formed by cutting of the cuttable portion is deformed.

As shown in FIG. 6, when cut at two positions, the cuttable portion 22 forms a separated piece 23, which is separated from the electric circuit 11 through the cutting action, and first and second remaining portions 241, 242, which remain connected with the electric circuit 11. At this time, the separated piece 23 has cut ends 23a, 23b at the opposite ends in the longitudinal direction of the cuttable portion 22. Also, the first remaining portion 241 has a cut end 24a, and the second remaining portion 242 has a cut end 24b. That is, the cut ends 23a, 24a are made by cutting the cuttable portion 22 at one of the two cutting positions and form a pair. The cut ends 23b, 24b are made by cutting the cuttable portion 22 at the other cutting position and form a pair.

The above described structure is the basic structure of the conduction-breaking device C. As shown in FIGS. 3 and 6, the conduction-breaking device C of the first embodiment includes a deforming mechanism 60 in addition to the above described base structure. The deforming mechanism 60 is configured to bend the separated piece 23 such that the cut ends 23a, 23b are located at the farthest positions from the gas generator 45 and a center portion 23c between the cut ends 23a, 23b is located at the closest position to the gas generator 45.

The deforming mechanism 60 includes a plate-shaped restricting portion 61 located in the arc-extinguishing chamber 32 and a recess 62 provided in the blade portion 52. The restricting portion 61 is configured to contact the center portion 23c of the separated piece 23 and restrict movement of the center portion 23c into the arc-extinguishing chamber 32. The restricting portion 61 extends toward the gas generator 45 from a position on the bottom wall surface 35 of the arc-extinguishing chamber 32 that is a center in the longitudinal direction of the cuttable portion 22. Parts of the restricting portion 61 on opposite sides in the width direction of the cuttable portion 22 are connected to the second inner side wall surfaces 34 of the arc-extinguishing chamber 32. The end face of the restricting portion 61 closer to the gas generator 45 has a curved shape bulging toward the gas generator 45.

The recess 62 is configured to deform the separated piece 23 in association with the restricting portion 61. The recess 62 has an opening between the outer end wall surfaces 56 of the blade portion 52 and is recessed toward the gas generator 45. Part of the inner wall of the recess 62 forms a pair of inclined surfaces 63. The inclined surfaces 63 extend in the width direction of the cuttable portion 22 from two positions separated from each other in the longitudinal direction of the cuttable portion 22. The inclined surfaces 63 are inclined with respect to the moving direction of the cutting member 50 to be closer to each other toward the gas generator 45. The recess 62 is formed to be the deepest at the center in the longitudinal direction of the cuttable portion 22.

That is, since the recess 62 has an opening formed in one outer end wall surface of the cutting member 50, the cutting member 50 has two outer end wall surfaces 56 on both sides of the recess 62 in the longitudinal direction of the cuttable portion 22.

Further, the conduction-breaking device C of the first embodiment includes a securing mechanism 70 for securing the cutting member 50 at a position where deformation of the separated piece 23 is complete.

That is, as shown in FIG. 5, the arc-extinguishing chamber 32 is shaped such that the distance between the second inner side wall surfaces 34 is constant at any position in the moving direction of the cutting member 50. That is, the second inner side wall surfaces 34 are parallel with each other. The blade portion 52 is shaped such that the distance between the second outer side wall surfaces 55 decreases toward the leading end in the moving direction of the cutting member 50. Thus, in the first embodiment, the second outer side wall surfaces 55 are inclined with respect to the moving direction of the cutting member 50 to meet the above conditions. The second inner side wall surfaces 34 of the arc-extinguishing chamber 32 and the second outer side wall surfaces 55 of the blade portion 52 constitute the securing mechanism 70.

The conduction-breaking device C of the first embodiment is constructed as described above. Operation of the conduction-breaking device C will now be described.

As shown in FIG. 2, when no collision of the vehicle 10 is detected by the collision sensor 17, no activation signal is output from the electronic control unit 18 to the gas generator 45, and gas is not generated from the gas generator 45. At this time, as shown in FIGS. 1 and 3, the cutting member 50 is located between the arc-extinguishing chamber 32 and the gas generator 45 and separated from the arc-extinguishing chamber 32. Therefore, the storage battery 12 and the converter 14 are electrically connected to each other via the conductive body 20.

When a collision of the vehicle 10 is detected by the collision sensor 17 while the conductive body 20 is carrying a current, the electronic control unit 18 delivers an activation signal to the gas generator 45. The activation signal activates the gas generator 45 to generate gas. The cutting member 50 receives the pressure of the gas directed toward the arc-extinguishing chamber 32. The guide protrusions 53 are guided in the guide grooves 42 of the guide chamber 41, so that the cutting member 50 is guided toward the arc-extinguishing chamber 32.

The cutting member 50 is rapidly moved toward the arc-extinguishing chamber 32 along the guide grooves 42. As the cutting member 50 moves, each movable blade 57 passes a position that is close to the corresponding fixed blade 37 with respect to the longitudinal direction of the cuttable portion 22. The outer end wall surfaces 56 of the blade portion 52 contact the cuttable portion 22 and push the cuttable portion 22 toward the arc-extinguishing chamber 32. The cuttable portion 22 receives shearing force generated by the movable blades 57 and the fixed blades 37 at positions separated from each other in the longitudinal direction of the cuttable portion 22. The shearing force simultaneously or substantially simultaneously cuts the cuttable portion 22 at two positions separated in the longitudinal direction of the cuttable portion 22.

As shown in FIG. 6, when cut at two positions, the cuttable portion 22 forms a separated piece 23, which is separated from the electric circuit 11 through the cutting action, and first and second remaining portions 241, 242, which remain connected with the electric circuit 11. The first and second remaining portions 241, 242 are not pushed by the blade portion 52 and thus remain at the arrangement portion 31. Through the cutting action, the cut ends 24a, 24b are formed at the ends of the first and second remaining portions 241, 242. The cut ends 24a, 24b of the first and second remaining portions 241, 242 are adjacent to the fixed blades 37.

The cutting member 50 continues to move after the cutting of the cuttable portion 22 is done, so that the blade portion 52 enters the interior of the arc-extinguishing chamber 32 through the opening 36. The separated piece 23 is pushed into the arc-extinguishing chamber 32 by the outer end wall surfaces 56 of the blade portion 52. The cut ends 23a, 23b, which are formed at the opposite ends of the separated piece 23, are separated from the cut ends 24a, 24b of the first and second remaining portions 241, 242, so that the conduction between the devices is broken.

At this time, a potential difference may occur between the cut ends 23a, 23b of the separated piece 23 and the cut ends 24a, 24b of the first and second remaining portions 241, 242. Such a potential difference may generate an arc. That is, insulation of gas present between the cut end 23a of the separated piece 23 and the cut end 24a of the first remaining portion 241 and insulation of gas present between the cut end 23b of the separated piece 23 and the cut end 24b of the second remaining portion 242 are broken to allow for a current flow.

However, since the cuttable portion 22 is cut at the two positions separated from each other in the longitudinal direction, the electric resistance is increased. Therefore, the voltage required to generate and maintain an arc is increased. That is, an arc is unlikely to be generated.

As opposed to the cut ends 24a, 24b of the first and second remaining portions 241, 242 being located at positions close to the fixed blades 37 as described above, the separated piece 23 is pushed into the arc-extinguishing chamber 32 by the blade portion 52, while being deformed by the deforming mechanism 60. That is, in the process of being pushed into the arc-extinguishing chamber 32 by the blade portion 52, the separated piece 23 contacts the restricting portion 61 at the center portion 23c. The center portion 23c of the separated piece 23 is restricted from moving further into the arc-extinguishing chamber 32. As the cutting member 50 continues to move, the opposite sides of the separated piece 23 in the longitudinal direction of the cuttable portion 22 continue to be pushed by the outer end wall surfaces 56 of the blade portion 52. The separated piece 23 is bent at the center portion 23c, at which the separated piece 23 contacts the restricting portion 61. The center portion 23c serves as a support point (bending point). Accordingly, the opposite sides of the separated piece 23 in the longitudinal direction of the cuttable portion 22 enter the arc-extinguishing chamber 32.

As the blade portion 52 moves into the arc-extinguishing chamber 32, the degree of bending of the separated piece 23 increases. When the blade portion 52 reaches a position in the arc-extinguishing chamber 32 at which the bottom of the recess 62 contacts the separated piece 23, that is, the position at which the separated piece 23 is held between the restricting portion 61 and the bottom of the recess 62, the inclined surfaces 63 of the recess 62 contact the separated piece 23. That is, the separated piece 23 is bent such that the cut ends 23a, 23b are located at the farthest positions from the gas generator 45 and the center portion 23c is located at the closest position to the gas generator 45. At this time, the cut ends 23a, 23b of the separated piece 23 are located on the leading side in the moving direction of the cutting member 50 with respect to the part of the separated piece 23 between the cut ends 23a, 23b.

Thus, compared to the conventional technique in which the separated piece 23 has the same flat shape as the shape prior to the cutting action (Japanese Laid-Open Patent Publication No. 2012-138286), the distance between the cut end 23a of the separated piece 23 and the cut end 24a of the first remaining portions 241 is long. Also, the distance between the cut end 23b of the separated piece 23 and the cut end 24b of the second remaining portions 241 is long. Thus, arc is easily attenuated.

As a result, adverse effects of arcs on the conduction-breaking device C are reduced. The cut end 23a of the separated piece 23 and the cut end 24a of the first remaining portion 241 are unlikely to be electrically connected by an arc, and the cut end 23b of the separated piece 23 and the cut end 24b of the second remaining portion 242 are unlikely to be electrically connected by an arc. It is thus unlikely that conduction will remain unbroken and be maintained despite the fact that the cut end 23a of the separated piece 23 is separated from the cut end 24a of the first remaining portion 241 and the cut end 23b of the separated piece 23 is separated from the cut end 24b of the second remaining portion 242, so that the conductive body 20 is physically cut. The conductive body 20 and the surrounding components made of plastic (for example, the case 30) are restrained from being softened or melted due to exposure to arcs of high temperatures.

In the process of the blade portion 52 entering the arc-extinguishing chamber 32, the separated piece 23 is deformed by the restricting portion 61 and the recess 62 as described above. In addition, as shown in FIG. 5, since the blade portion 52 enters the arc-extinguishing chamber 32, the second outer side wall surfaces 55 of the blade portion 52 are pressed against the second inner side wall surfaces 34 of the arc-extinguishing chamber 32. This is because the distance between the second inner side wall surfaces 34 of the arc-extinguishing chamber 32 is constant at any position in the moving direction of the cutting member 50, whereas the distance between the second outer side wall surfaces 55 of the blade portion 52 decreases toward the leading end in the moving direction.

Since the second outer side wall surfaces 55 of the blade portion 52 are pressed against the second inner side wall surfaces 34 of the arc-extinguishing chamber 32, the cutting member 50 maintains the separated piece 23 in the deformed state between the recess 62 of the cutting member 50 and the restricting portion 61 of the arc-extinguishing chamber 32 as shown in FIG. 6 even after the deforming mechanism 60 deforms the separated piece 23.

Thus, the cut ends 23a, 23b of the separated piece 23 continue to be located at the farthest positions from the gas generator 45 and the center portion 23c of the separated piece 23 continues to be located at the closest position to the gas generator 45. The distance between the cut end 23a of the separated piece 23 and the cut end 24a of the first remaining portion 241 is maintained after the separated piece 23 is deformed. The distance between the cut end 23b of the separated piece 23 and the cut end 24b of the second remaining portion 242 is also maintained after the separated piece 23 is deformed. That is, the distances between the cut ends 23a, 23b of the separated piece 23 and the cut ends 24a, 24b of the first and second remaining portions 241, 242 are stabilized.

The first embodiment as described above has the following advantages.

(1) The first embodiment is related to the conduction-breaking device C (FIG. 6), in which the cuttable portion 22 is cut at two positions separated from each other in the longitudinal direction, so that the cuttable portion 22 forms the separated piece 23 and the first and second remaining portions 241, 242. Accordingly, an arc generated between the cut end 23a of the separated piece 23 and the cut end 24a of the first remaining portion 241 and an arc generated between the cut end 23b of the separated piece 23 and the cut end 24b of the second remaining portion 242 are attenuated in the arc-extinguishing chamber 32.

The conduction-breaking device C includes the deforming mechanism 60, which deforms the separated piece 23, which has been pushed into the arc-extinguishing chamber 32 by the cutting member 50, such that the cut ends 23a, 23b are located on the leading side in the moving direction of the cutting member 50 with respect to the part of the separated piece 23 between the cut ends 23a, 23b (FIG. 6).

Thus, compared to a case in which a separated piece has the same flat shape as the shape prior to a cutting action (Japanese Laid-Open Patent Publication No. 2012-138286), the distance between the cut end 23a of the separated piece 23 and the cut end 24a of the first remaining portions 241 and the distance between the cut end 23b of the separated piece 23 and the cut end 24b of the second remaining portions 242 are long, so that the arc attenuating performance is improved.

(2) The deforming mechanism 60 bends the separated piece 23 such that the cut ends 23a, 23b are located at the farthest positions from the gas generator 45 and the center portion 23c is located at the closest position to the gas generator 45 (FIG. 6).

Thus, the distance between the cut end 23a of the separated piece 23 and the cut end 24a of the first remaining portion 241 and the distance between the cut end 23b of the separated piece 23 and the cut end 24b of the second remaining portion 242 are longer than that in a case in which the separated piece 23 is deformed into a different shape, so that arcs are effectively attenuated.

(3) The deforming mechanism 60 includes the restricting portion 61 located in the arc-extinguishing chamber 32 and the recess 62 in the cutting member 50 (FIGS. 3 and 6).

Thus, the separated piece 23 is bent at the center portion 23c, at which the separated piece 23 contacts the restricting portion 61. The center portion 23c serves as a support point (bending point). Accordingly, the opposite sides of the contacting portion in the longitudinal direction of the cuttable portion 22 enter the interior of the arc-extinguishing chamber 32, so that the separated piece 23 is deformed into a shape that meets the conditions of the above the item (2).

(4) The conduction-breaking device C further includes the securing mechanism 70, which secures the cutting member 50 at the position, where deformation of the separated piece 23 by the deforming mechanism 60 is complete (FIG. 5).

Thus, even after the separated piece 23 is deformed by the deforming mechanism 60, the distances between the cut ends 23a, 23b of the separated piece 23 and the cut ends 24a, 24b of the first and second remaining portions 241 and 242 are maintained to be long, so that the arc attenuating performance is maintained at a high level.

(5) The inner wall surfaces of the arc-extinguishing chamber 32 include the two second inner side wall surfaces 34, which face each other in the width direction of the cuttable portion 22. The second inner side wall surfaces 34 are formed to be parallel with each other. The outer wall surfaces of the blade portion 52 include the two second outer side wall surfaces 55, which face away from each other in the width direction of the cuttable portion 22. The two second outer side wall surfaces 55 are formed such that the distance between the second outer side wall surfaces 55 decreases toward the leading end in the moving direction of the cutting member 50. The securing mechanism 70 is configured by the second inner side wall surfaces 34 of the arc-extinguishing chamber 32 and the second outer side wall surfaces 55 of the blade portion 52 (FIG. 5).

Thus, in the process of the blade portion 52 entering the arc-extinguishing chamber 32, the second outer side wall surfaces 55 of the blade portion 52 are pressed against the second inner side wall surfaces 34 of the arc-extinguishing chamber 32. Therefore, the cutting member 50 is secured at the position where deformation of the separated piece 23 is completed to ensure the advantage of the item (4).

(6) The cutting member 50 receives the pressure of the gas from the gas generator 45 and is moved toward the arc-extinguishing chamber 32. To receive the kinetic energy of the cutting member 50, the fixed blades 37 and the surrounding parts in the case 30 are required to have a high stiffness (FIGS. 3 and 6).

In this regard, in the first embodiment, some of the kinetic energy of the cutting member 50 is consumed to deform the separated piece 23. In correspondence with such consumption of the kinetic energy, the required stiffness of the fixed blades 37 and the surrounding parts is reduced.

Second Embodiment

A conduction-breaking device C for a vehicle according to a second embodiment will now be described with reference to FIGS. 7 and 8.

In the second embodiment, the securing mechanism 70 is replaced by a first holding mechanism 80. The first holding mechanism 80 holds the separated piece 23, which has been deformed by the restricting portion 61 and the recess 62, in a state of being held in contact with the restricting portion 61. The first holding mechanism 80 includes a columnar engaging projection 81 provided in the restricting portion 61 and an engagement portion 82 in the cuttable portion 22. The engaging projection 81 projects toward the gas generator 45 from the end of the restricting portion 61 closer to the gas generator 45. The engaging projection 81 is provided at the end of the restricting portion 61 closer to the gas generator 45, specifically, in a part of that end in the width direction of the cuttable portion 22. A plurality of engaging projections 81 and a plurality of engagement portions 82 may be provided.

The engagement portion 82 is provided in a section of the cuttable portion 22 that will be the separated piece 23 and contact the restricting portion 61. The engagement portion 82 is formed by a circular hole, which extends through the cuttable portion 22 in the thickness direction. The inner diameter of the engagement portion 82 is slightly less than the diameter of the engaging projection 81.

Other than these differences, the second embodiment is the same as the first embodiment. Thus, like or the same reference numerals are given to those components that are like or the same as the corresponding components described above in the first embodiment and detailed explanations are omitted.

In the second embodiment, the cutting member 50 receives the pressure of the gas from the gas generator 45 and is moved toward the arc-extinguishing chamber 32. The cuttable portion 22 is cut at two positions that are on the opposite sides of the engagement portion 82 and separated from the engagement portion 82 in the longitudinal direction. Accordingly, the cuttable portion 22 forms a separated piece 23 and first and second remaining portions 241, 242.

In the process of the separated piece 23 being pushed into the arc-extinguishing chamber 32 by the blade portion 52, the engaging projection 81, which protrudes from the restricting portion 61 toward the gas generator 45, is press-fitted in the engagement portion 82 of the cuttable portion 22 (the separated piece 23).

Further, the separated piece 23 contacts the restricting portion 61. Thereafter, since the blade portion 52 continues to move, the separated piece 23 is bent such that, as shown in FIG. 8, the cut ends 23a, 23b are located at the farthest positions from the gas generator 45 and the center portion 23c is located at the closest position to the gas generator 45.

By press fitting the engaging projection 81 into the engagement portion 82, the outer wall surface of the engaging projection 81 is pressed against the inner wall surface of the engagement portion 82, so that the separated piece 23 is maintained in contact with the restricting portion 61. The cut ends 23a, 23b of the separated piece 23 are maintained in a state of being separated from the cut ends 24a, 24b of the first and second remaining portions 241, 242. The distance between the cut end 23a of the separated piece 23 and the cut end 24a of the first remaining portion 241 and the distance between the cut end 23b of the separated piece 23 and the cut end 24b of the second remaining portion 242 are also maintained after the separated piece 23 is deformed. That is, the distances between the cut ends 23a, 23b of the separated piece 23 and the cut ends 24a, 24b of the first and second remaining portions 241, 242 are stabilized. This advantage is also achieved even if the cutting member 50 moves toward the gas generator 45 due to the own weight.

Thus, the second embodiment achieves the following advantages in addition to the advantages of the items (1) to (3), and (6).

Figure 8:
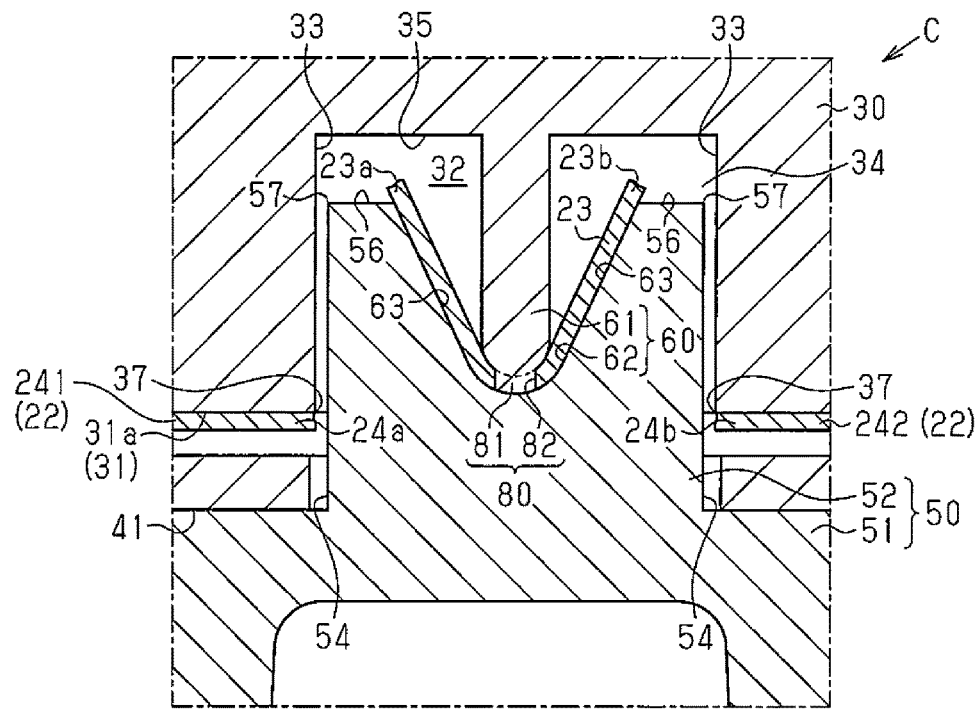
FIG. 8 is a partial cross-sectional view of the second embodiment, illustrating a state after the separated piece formed by cutting of the cuttable portion is deformed.

(7) The conduction-breaking device C includes the first holding mechanism 80, which holds the separated piece 23, which has been deformed by the restricting portion 61 and the recess 62, in a state of being held in contact with the restricting portion 61 (FIG. 8).

Thus, even after the deforming mechanism 60 deforms the separated piece 23, the separated piece 23 continues to contact the restricting portion 61. The distances between the cut ends 23a, 23b of the separated piece 23 and the cut ends 24a, 24b of the first and second remaining portions 241 and 242 are maintained to be long, so that the arc attenuating performance is maintained at a high level.

Figure 7:
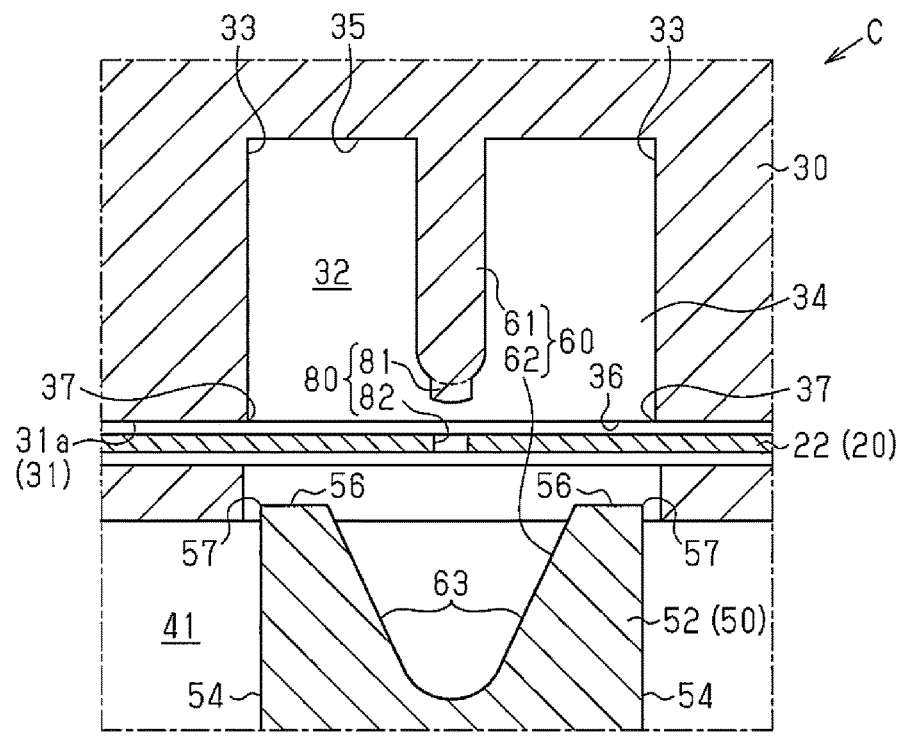
FIG. 7 is a partial cross-sectional view of a conduction-breaking device for a vehicle according to a second embodiment, illustrating a state before the cuttable portion is cut.

(8) The first holding mechanism 80 includes the engaging projection 81, which projects from the restricting portion 61 toward the gas generator 45, and the engagement portion 82, which is arranged at a part of the cuttable portion 22 that is to become the separated piece 23 and is press-fitted in the engagement portion 82 (FIG. 7).

Thus, the press fitting presses the outer wall surface of the engaging projection 81 against the inner wall surface of the engagement portion 82, so that the separated piece 23 is maintained in contact with the restricting portion 61 and the advantage of the item (7) is achieved.

Third Embodiment

A conduction-breaking device C for a vehicle according to a third embodiment will now be described with reference to FIGS. 9 to 11.

In the third embodiment, a second holding mechanism 90 is further provided, which holds the separated piece 23, which has been deformed by the restricting portion 61 and the recess 62, in a state of being held in contact with the inner wall surfaces of the recess 62.

Figure 9:
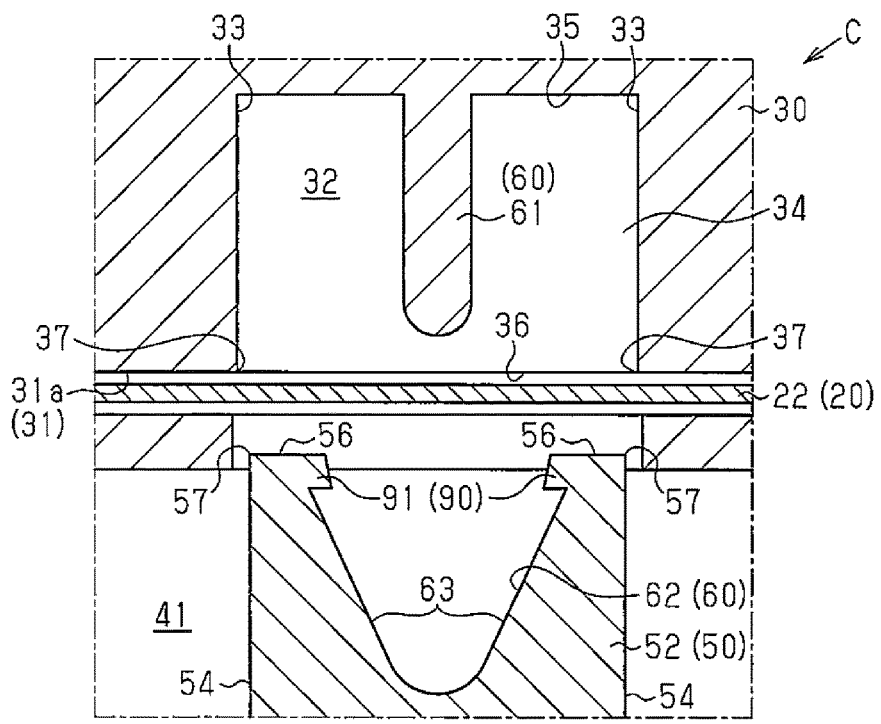
FIG. 9 is a partial cross-sectional view of a conduction-breaking device for a vehicle according to a third embodiment, illustrating a state before the cuttable portion is cut.
Figure 10:
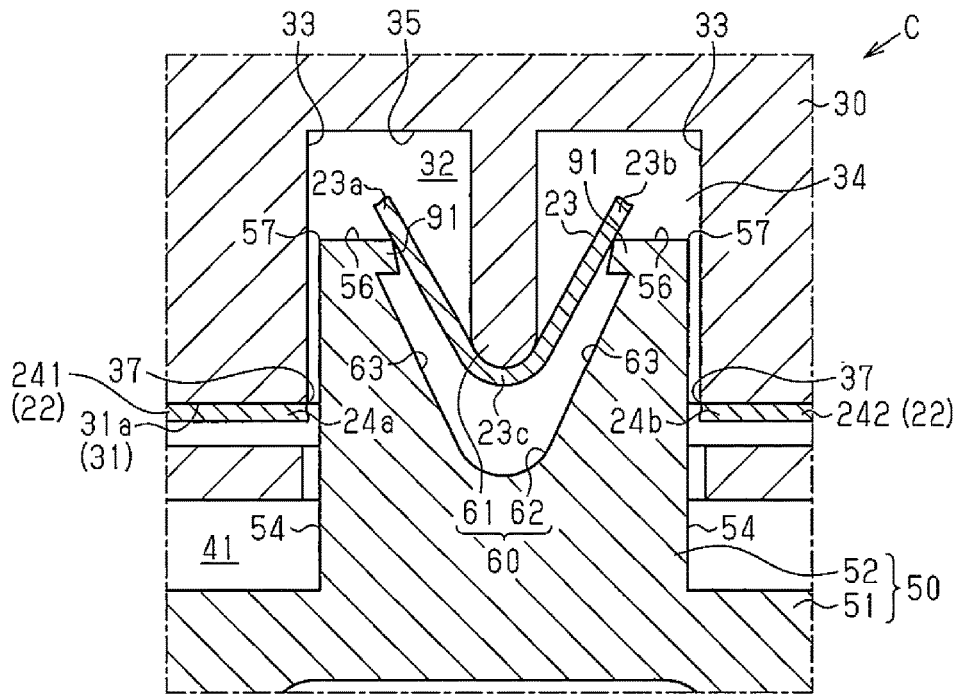
FIG. 10 is a partial cross-sectional view of the third embodiment, illustrating a state in which the separated piece formed by cutting of the cuttable portion is being deformed.

As shown in FIG. 9, the second holding mechanism 90 includes a pair of restricting pieces 91 provided in the blade portion 52 of the cutting member 50. Each restricting piece 91 is provided at the boundary between of one of the inclined surfaces 63 in the recess 62 and the corresponding outer end wall surface 56 of the blade portion 52. Each restricting piece 91 projects toward the other facing restricting piece 91. The restricting pieces 91 reduces the dimension of the recess 62 along the length of the cuttable portion 22 at the outer end wall surfaces 56 compared to a case in which the restricting pieces 91 are not provided.

Other than these differences, the third embodiment is the same as the first embodiment. Thus, like or the same reference numerals are given to those components that are like or the same as the corresponding components described above in the first embodiment and detailed explanations are omitted.

In the third embodiment, the cutting member 50 receives the pressure of the gas from the gas generator 45 and is moved toward the arc-extinguishing chamber 32. The two fixed blades 37 and the two movable blades 57 cut the cuttable portion 22 at two positions. Accordingly, the cuttable portion 22 forms a separated piece 23 and first and second remaining portions 241, 242 as shown in FIG. 10.

In the process of being pushed into the arc-extinguishing chamber 32 by the blade portion 52, the separated piece 23 contacts the restricting portion 61. The center portion 23c of the separated piece 23, which contacts the restricting portion 61, is restricted from moving further into the arc-extinguishing chamber 32. As the cutting member 50 continues to move, the opposite sides of the separated piece 23 in the longitudinal direction of the cuttable portion 22 continue to be pushed by the two outer end wall surfaces 56 of the blade portion 52. The separated piece 23 is bent at the center portion 23c, at which the separated piece 23 contacts the restricting portion 61. The center portion 23c serves as a support point (bending point). Accordingly, the separated piece 23 is bent such that the opposite sides in the longitudinal direction of the cuttable portion 22 enter the arc-extinguishing chamber 32.

As the blade portion 52 moves into the arc-extinguishing chamber 32, the degree of bending of the separated piece 23 increases. The thus bent separated piece 23 passes through between the two restricting pieces 91. At this time, the separated piece 23 is elastically deformed by a greater degree than in a case in which the restricting pieces 91 are not provided. When the cut ends 23a, 23b of the separated piece 23 pass the restricting pieces 91 as shown in FIG. 11, the separated piece 23 acts to restore the shape prior to the deformation due to its elastic restoring force and contacts the inner wall surfaces (the inclined surfaces 63) of the recess 62. The separated piece 23 is bent such that the cut ends 23a, 23b are located at the farthest positions from the gas generator 45 and the center portion 23c is located at the closest position to the gas generator 45.

The restricting pieces 91 contact the cut end 23a, 23b of the separated piece 23, thereby restricting the separated piece 23 from exiting the recess 62. Accordingly, the separated piece 23 is maintained in contact with the inner wall surfaces of the recess 62.

Even after the deforming mechanism 60 deforms the separated piece 23, the securing mechanism 70 of the cutting member 50 maintains the separated piece 23 in the deformed state between the recess 62 of the cutting member 50 and the restricting portion 61 of the arc-extinguishing chamber 32.

Thus, the cut ends 23a, 23b of the separated piece 23 continue to be located at the farthest positions from the gas generator 45 and the center portion 23c continues to be located at the closest position to the gas generator 45. The cut ends 23a, 23b of the separated piece 23 are maintained in a state of being separated from the cut ends 24a, 24b of the first and second remaining portions 241, 242. The distance between the cut end 23a of the separated piece 23 and the cut end 24a of the first remaining portion 241 and the distance between the cut end 23b of the separated piece 23 and the cut end 24b of the second remaining portion 242 are also maintained after the separated piece 23 is deformed. That is, the distances between the cut ends 23a, 23b of the separated piece 23 and the cut ends 24a, 24b of the first and second remaining portions 241, 242 are stabilized.

Thus, the third embodiment achieves the following advantages in addition to the advantages of the items (1) to (6).

Figure 11:
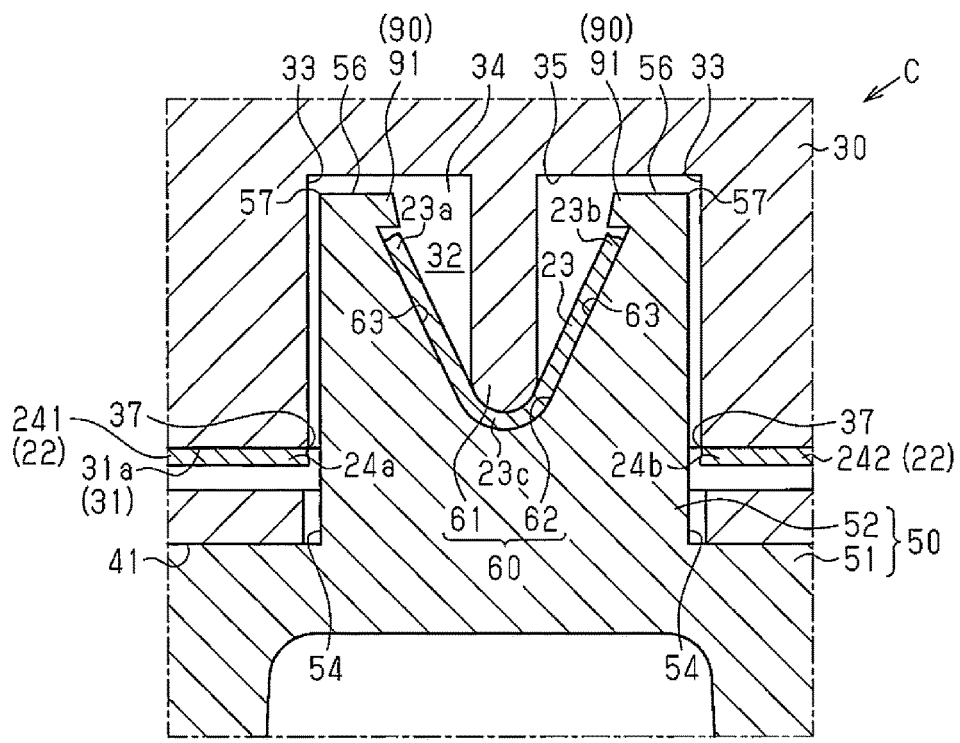
FIG. 11 is a partial cross-sectional view of the third embodiment, illustrating a state after the separated piece is deformed.

(9) The conduction-breaking device C includes the second holding mechanism 90, which holds the separated piece 23, which has been deformed by the restricting portion 61 and the recess 62, in a state of being held in contact with the inner wall surfaces (the inclined surfaces 63) of the recess 62 (FIG. 11).

Thus, even after the separated piece 23 is deformed, the separated piece 23 is maintained to be in contact with the inner wall surfaces (the inclined surfaces 63) of the recess 62 in the cutting member 50, which is secured to the arc-extinguishing chamber 32 by the securing mechanism 70. The distances between the cut ends 23a, 23b of the separated piece 23 and the cut ends 24a, 24b of the first and second remaining portions 241 and 242 are maintained to be long, so that the arc attenuating performance is maintained at a high level.

(10) The second holding mechanism 90 includes the two restricting pieces 91 in the blade portion 52 at two positions on the opposite sides of the recess 62 in the longitudinal direction of the cuttable portion 22 (FIG. 9).

Thus, the deformed separated piece 23 is restricted from exiting the recess 62 by the two restricting pieces 91, so that the separated piece 23 is maintained to be in contact with the inner wall surfaces (the inclined surfaces 63) of the recess 62, and the advantage of the item (9) is achieved.

The above embodiments may be modified as follows.

<Regarding the Movable Blades 57>

In the above illustrated embodiments, the two movable blades 57 are provided at the same position in the moving direction of the cutting member 50. However, the position of the movable blades 57 may be differentiated. In other words, one of the movable blades 57 may be located closer to or farther from the gas generator 45 than the other movable blade 57. In this configuration, the cuttable portion 22 is cut twice, that is, cut at two positions at different times. Thus, compared to a case in which the cuttable portion 22 is cut at two positions at one time, a single cutting motion requires less force.

<Regarding the Deforming Mechanism 60>

Figure 12:
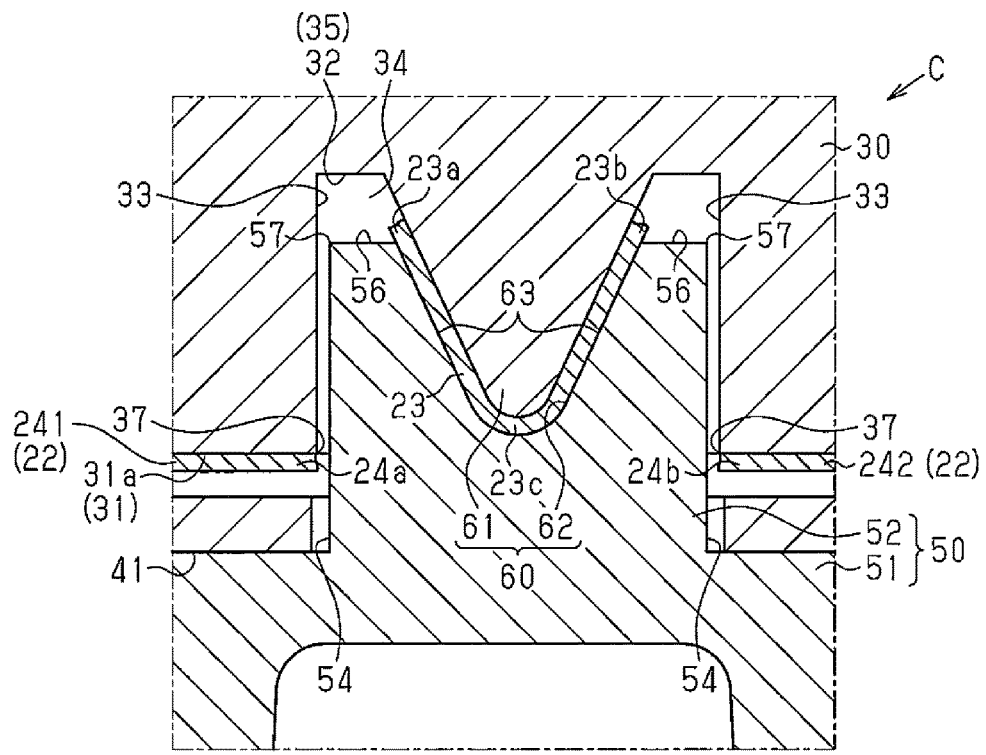
FIG. 12 is a partial cross-sectional view of a restricting portion according to a modification, illustrating a state after the separated piece formed by cutting of the cuttable portion is deformed.

The shape of the restricting portion 61 may be modified to a shape different from that in each of the above illustrated embodiments. FIG. 12 illustrates one such example. In the modification of FIG. 12, the restricting portion 61 has a shape that conforms to the recess 62 of the blade portion 52. That is, the dimension in the longitudinal direction of the cuttable portion 22 decreases toward the gas generator 45 (inverted triangular cross-sectional shape).

In this case, the separated piece 23 is deformed along the outer wall surfaces of the restricting portion 61 and the inner wall surfaces of the recess 62.

The first holding mechanism 80 (the engaging projection 81, the engagement portion 82) of the second embodiment may be applied to the modification of FIG. 12.

The restricting portion 61 does not necessarily need to be connected to the bottom wall surface 35 of the arc-extinguishing chamber 32. That is, the leading end of the restricting portion 61 in the moving direction of the cutting member 50 may be separated from the bottom wall surface 35 of the arc-extinguishing chamber 32.

Figure 13:
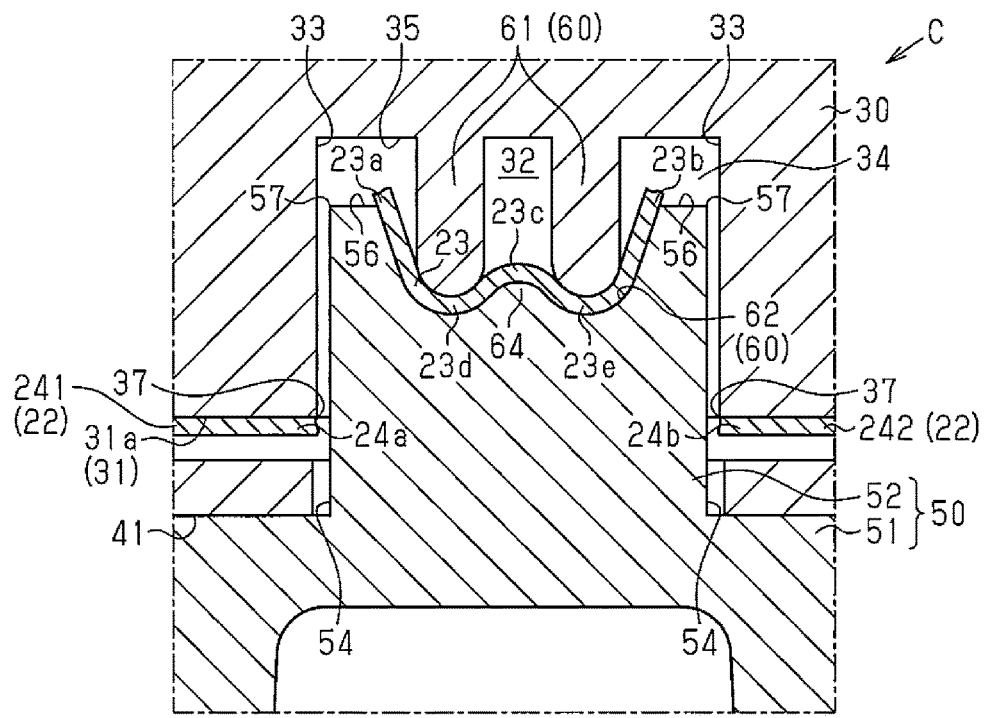
FIG. 13 is a partial cross-sectional view of a deforming mechanism according to a modification, illustrating a state after the separated piece formed by cutting of the cuttable portion is deformed.

The separated piece 23 may be deformed into a shape different from those in the above illustrated embodiment by the deforming mechanism 60. FIG. 13 illustrates one such example. In the modification of FIG. 13, a middle portion 23d is defined between the cut end 23a and the center portion 23c of the separated piece 23 in the longitudinal direction of the cuttable portion 22. Another middle portion 23e is defined between the cut end 23b and the center portion 23c. Instead of the center portion 23c, the middle portions 23d, 23e are located at the closest position to the gas generator 45.

Even this case, the cut ends 23a, 23b of the separated piece 23 are located on the leading side in the moving direction of the cutting member 50 with respect to the part of the separated piece 23 between the cut ends 23a, 23b. Thus, compared to a case in which a separated piece has the same flat shape as the shape prior to a cutting action, the distances between the cut ends 23a, 23b of the separated piece 23 and the cut ends 24a, 24b of the first and second remaining portions 241, 242 are long, so that the arc attenuating performance is improved.

Deformation of the separated piece 23 may be achieved, for example, as shown in FIG. 13, by providing restricting portions 61 at two positions spaced apart in in the longitudinal direction of the cuttable portion 22 and a bulging portion 64 on the bottom of the recess 62 of the blade portion 52. The bulging portion 64 is located between the restricting portions 61 and bulges toward the bottom of the arc-extinguishing chamber 32.

One or both of the first holding mechanism 80 (the engaging projection 81, the engagement portion 82) of the second embodiment and the second holding mechanism 90 (the restricting pieces 91) of the third embodiment may be applied to the modification of FIG. 13.

<Regarding the Engagement Portion 82>

In the second embodiment, the engagement portion 82, in which the engaging projection 81 is press-fitted, may be, instead of a through-hole extending along the thickness of the cuttable portion 22, a recess in the surface of the cuttable portion 22 that faces the arc-extinguishing chamber 32.

<Regarding the Securing Mechanism 70>

As in the other embodiments, the second embodiment may employ the securing mechanism 70.

Only one of the second outer side wall surfaces 55 may be inclined with respect to the moving direction of the cutting member 50 such that the distance between the second outer side wall surfaces 55 decreases toward the leading end in the moving direction of the cutting member 50.

OTHER MODIFICATIONS

The second embodiment and the third embodiment may be combined. In this case, the first holding mechanism 80 (the engaging projection 81, the engagement portion 82) and the second holding mechanism 90 (the restricting pieces 91) are both employed.

In each of the above illustrated embodiments, the case 30 and the cutting member 50 are made of plastic. However, the case 30 and the cutting member 50 may be made of any material as long as it has a sufficient strength for cutting the cuttable portion 22 and an adequate electrical insulating property.

In each of the above illustrated embodiments, as methods for forming the case 30 and the cutting member 50, any method may be employed such as molding and machining.

The conduction-breaking device C is not limited to the one placed between the storage battery 12 and the converter 14. The present invention may be applied to any device that is placed between devices in an electric circuit and is designed to break the conduction between the devices. Such conduction-breaking devices include, for example, a conduction-breaking device placed between a fuel cell and a vehicle driving motor in a fuel cell vehicle, a conduction-breaking device placed between a power source and an electric device in a stationary system, and a conduction-breaking device placed between electric devices in a stationary system.

The invention claimed is:

1. A conduction-breaking device configured to break conduction between a pair of devices in an electric circuit, the conduction-breaking device comprising:
  a conductive body arranged between the devices, wherein the conductive body includes an elongated plate-shaped cuttable portion;
  an arc-extinguishing chamber, which is formed on one side of the cuttable portion in a thickness direction and has a pair of fixed blades;
  a gas generator, which is arranged on an opposite side of the cuttable portion from the arc-extinguishing chamber in the thickness direction; and
  a cutting member, which is arranged between the cuttable portion and the gas generator to be moved toward the arc-extinguishing chamber by gas generated by the gas generator, wherein:
  the cutting member includes a pair of movable blades, which cooperates with the fixed blades to cut the cuttable portion, when the cuttable portion is cut at two positions by the fixed blades and the movable blades, the cuttable portion forms a separated piece, which is separated from the electric circuit and pushed into the arc-extinguishing chamber by the cutting member, and first and second remaining portions, which remain connected with the electric circuit, and thus conduction between the devices is broken, the separated piece has cut ends, which are formed by cutting of the cuttable portion, at opposite ends, the first and second remaining portions each have a cut end, which is formed by cutting of the cuttable portion, an arc generated between the cut end of the first remaining portion and the corresponding cut end of the separated piece and an arc generated between the cut end of the second remaining portion and the corresponding cut end of the separated piece are attenuated in the arc-extinguishing chamber, the conduction-breaking device further includes a deforming mechanism, which deforms the separated piece such that the cut ends of the separated piece are located on a leading side in a moving direction of the cutting member with respect to a part of the separated piece between the cut ends, and the deforming mechanism bends the separated piece such that the cut ends of the separated piece are located at farthest positions from the gas generator and a center portion between the cut ends is located at a closest position to the gas generator.

2. The conduction-breaking device according to claim 1, wherein:

outer wall surfaces of the cutting member include an outer end wall surface, which is located on a leading side in the moving direction of the cutting member, and the deforming mechanism includes:
a restricting portion, which is arranged in the arc-extinguishing chamber and at least at a center portion in a longitudinal direction of the cuttable portion, wherein the restricting portion restricts at least the center portion of the separated piece from moving into the arc-extinguishing chamber, and a recess, which opens in the outer end wall surface of the cutting member and is recessed toward the gas generator, wherein the restricting portion enters the recess as the cutting member moves.

3. The conduction-breaking device according to claim 2, further comprising
a first holding mechanism, which holds the separated piece, which has been deformed by the restricting portion and the recess, in a state of being held in contact with the restricting portion.

4. The conduction-breaking device according to claim 3, wherein
the first holding mechanism includes:
an engaging projection, which projects from the restricting portion toward the gas generator, and
an engagement portion, which is formed in a section of the cuttable portion that will be the separated piece, wherein the engaging projection is press-fitted in the engagement portion.

5. The conduction-breaking device according to claim 2, further comprising
a second holding mechanism, which holds the separated piece, which has been deformed by the restricting portion and the recess, in a state of being held in contact with an inner wall surface of the recess.

6. The conduction-breaking device according to claim 5, wherein
the second holding mechanism includes two restricting pieces, which are at positions on opposite sides of the recess in the longitudinal direction of the cuttable portion and restrict the separated piece from exiting the recess.

7. The conduction-breaking device according to claim 1, further comprising
a securing mechanism, which secures the cutting member at a position at which deformation of the separated piece by the deforming mechanism is completed.

8. The conduction-breaking device according to claim 7, wherein:
the cutting member includes a blade portion that has the movable blades, wherein, as the cutting member moves, the blade portion enters the arc-extinguishing chamber to cut the cuttable portion, inner wall surfaces of the arc-extinguishing chamber include two inner side wall surfaces, which face each other in a width direction of the cuttable portion, the inner side wall surfaces being formed to be parallel with each other, outer wall surfaces of the blade portion include two outer side wall surfaces, which face away from each other in the width direction of the cuttable portion, wherein the outer side wall surfaces are formed such that the distance between the outer side wall surfaces decreases toward a leading end in the moving direction of the cutting member, and the securing mechanism is configured by the inner side wall surfaces of the arc-extinguishing chamber and the outer side wall surfaces of the blade portion.

* * * * *